United States Patent
Rett et al.

(10) Patent No.: US 12,379,500 B2
(45) Date of Patent: Aug. 5, 2025

(54) LASER RANGING AND SPEED MEASUREMENT DEVICE INCORPORATING ON-BOARD DATA STORAGE WITH GPS, COMPASS, EXCESSIVE PANNING DETECTION AND VOICE RECOGNITION TECHNOLOGY

(71) Applicants: Laser Technology, Inc., Centennial, CO (US); Kama-Tech (HK) Limited, Hong Kong (CN)

(72) Inventors: William E. Rett, Centennial, CO (US); Vinny A. Alvino, Centennial, CO (US); Eric A. Miller, Englewood, CO (US); Jeremy G. Dunne, Parker, CO (US); Neil T. Heeke, Kimberling City, MO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 46 days.

(21) Appl. No.: 18/093,249

(22) Filed: Jan. 4, 2023

(65) Prior Publication Data
US 2023/0146823 A1    May 11, 2023

Related U.S. Application Data

(63) Continuation-in-part of application No. 16/688,633, filed on Nov. 19, 2019, now Pat. No. 11,663,910.

(60) Provisional application No. 62/769,803, filed on Nov. 20, 2018.

(51) Int. Cl.
| | |
|---|---|
| *G01S 17/58* | (2006.01) |
| *G01S 7/497* | (2006.01) |
| *H04R 1/08* | (2006.01) |

(52) U.S. Cl.
CPC ............. *G01S 17/58* (2013.01); *G01S 7/497* (2013.01); *H04R 1/08* (2013.01)

(58) Field of Classification Search
CPC .......... G01S 17/58; G01S 7/497; G01S 17/10; G01S 17/86; G01S 7/4813; H04R 1/08
See application file for complete search history.

(56) References Cited

U.S. PATENT DOCUMENTS

| | | | |
|---|---|---|---|
| 4,025,761 | A | 5/1977 | Hayosh |
| 5,717,195 | A | 2/1998 | Feng |
| 6,636,701 | B1 | 10/2003 | Vezard |

(Continued)

FOREIGN PATENT DOCUMENTS

| | | |
|---|---|---|
| EP | 0680027 | 11/1995 |

OTHER PUBLICATIONS

Anonymous, "Raspberry Pi," Mar. 10, 2016, Retrieved from the Internet: https://web.archive.org/web/20160310192010/http://www.truetex.com/raspberrypi.

(Continued)

*Primary Examiner* — Michael E Teitelbaum
(74) *Attorney, Agent, or Firm* — Hogan Lovells US LLP

(57) ABSTRACT

A handheld laser-based vehicle speed measurement device incorporating on-board data storage with GPS, compass, excess panning detection, and voice recognition technology, as well as, recording minimum and maximum speeds of a plurality of vehicles along a roadway and calculating the $85^{th}$ percentile speed.

29 Claims, 8 Drawing Sheets

(56) References Cited

U.S. PATENT DOCUMENTS

| | | | |
|---|---|---|---|
| 6,696,978 | B2 | 2/2004 | Trajkovic |
| 7,133,608 | B1 | 11/2006 | Nagata |
| 7,708,205 | B2 | 5/2010 | Kotlarsky |
| 7,898,745 | B2 | 3/2011 | Matsui |
| 7,920,251 | B2 | 4/2011 | Chung |
| 8,311,343 | B2 | 11/2012 | Chung |
| 8,446,467 | B2 | 5/2013 | Tilton |
| 9,247,215 | B1 * | 1/2016 | Athan .................... G01S 7/003 |
| 9,964,805 | B2 | 5/2018 | Dunne |
| 10,146,103 | B2 | 12/2018 | Dunne |
| 2002/0136150 | A1 | 9/2002 | Mihara |
| 2002/0177947 | A1 * | 11/2002 | Cayford .......... G08G 1/096811 |
| | | | 701/445 |
| 2004/0062533 | A1 | 4/2004 | Koike |
| 2004/0101166 | A1 * | 5/2004 | Williams .................. G01P 3/38 |
| | | | 348/148 |
| 2005/0088562 | A1 | 4/2005 | Noto |
| 2007/0154202 | A1 | 7/2007 | Lee |
| 2008/0071467 | A1 * | 3/2008 | Johnson .................. H04L 67/12 |
| | | | 701/119 |
| 2008/0263380 | A1 * | 10/2008 | Dryer ........................ G06F 1/14 |
| | | | 713/400 |
| 2009/0079960 | A1 * | 3/2009 | Chung .................... G01S 17/86 |
| | | | 356/28 |
| 2009/0091821 | A1 | 4/2009 | Regan |
| 2009/0128934 | A1 | 5/2009 | Plangger |
| 2010/0128127 | A1 | 5/2010 | Ciolli |
| 2010/0260387 | A1 | 10/2010 | Lee |
| 2014/0063261 | A1 * | 3/2014 | Betensky ............. G02B 23/145 |
| | | | 348/158 |
| 2014/0362231 | A1 | 12/2014 | Bietsch |
| 2015/0237260 | A1 * | 8/2015 | Mukunashi ........ H04N 23/6815 |
| | | | 348/208.11 |
| 2016/0044250 | A1 | 2/2016 | Shabtay |
| 2016/0116577 | A1 * | 4/2016 | Dunne .................... G01S 7/497 |
| | | | 356/5.01 |
| 2017/0032666 | A1 | 2/2017 | Pretorius |
| 2017/0132477 | A1 | 5/2017 | Kim |
| 2017/0177965 | A1 | 6/2017 | Soldevila |
| 2017/0285444 | A1 | 10/2017 | Dunne |

OTHER PUBLICATIONS

Anonymous, "960H varifocal Low Illumination HD Usb Camera USB2.0 AR0130 Sensor with IR Cut and 2.8-12 Lens," Mar. 5, 2016, Retrieved from the Internet: URL: https://web.archive.org/web/20160305064319/http://www.elpcctv.com:80/960h-varifocal-low-illumination-hd-usb-camera-usb20-a-r0130-sensor-with-ir-cut-and-2812-lens-p-2-11.html.
Extended European Search Report mailed Aug. 22, 2017 in corresponding EP Patent Application No. EP 17164273.9.
International Search Report and Written Opinion corresponding to PCT/US2019/062235 dated Feb. 28, 2020.
Extended European Search Report mailed Jun. 20, 2022 in corresponding EP Patent Application No. EP 19886437.3.

* cited by examiner

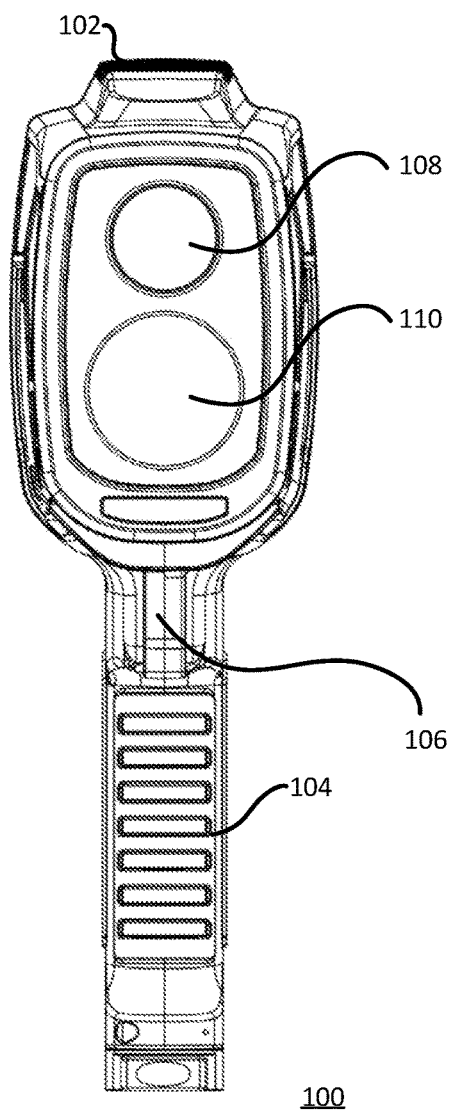
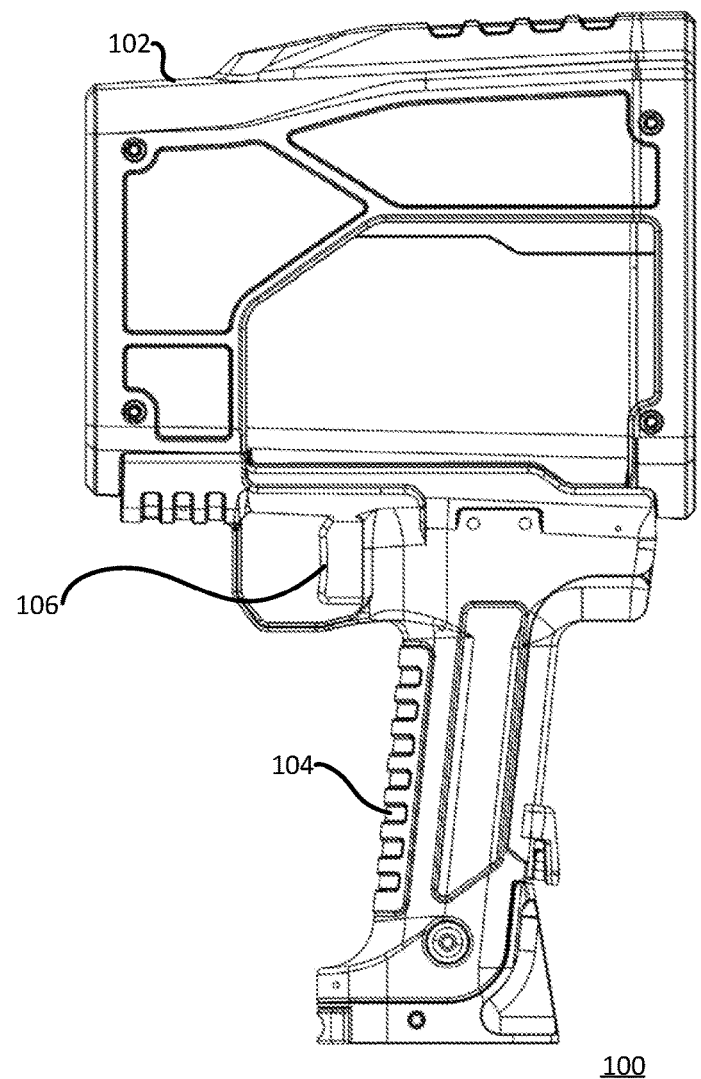
*Fig. 1A*     *Fig. 1B*

LASER RANGING AND SPEED MEASUREMENT DEVICE INCORPORATING ON-BOARD DATA STORAGE WITH GPS, COMPASS, EXCESSIVE PANNING DETECTION AND VOICE RECOGNITION TECHNOLOGY

CROSS REFERENCE TO RELATED PATENT APPLICATIONS

The present invention is a continuation-in-part of U.S. patent application Ser. No. 16/688,633 filed on Nov. 19, 2019 for "Handheld Laser-Based Vehicle Speed Measurement Device Incorporating an Automatic Number Plate Recognition (ANPR) Function" which is related to and claims priority from U.S. Provisional Patent Application Ser. No. 62/769,803 filed Nov. 20, 2018. The present application is also related to U.S. patent application Ser. No. 15/473,307 filed on Mar. 29, 2017, for "Camera Module and Folded Optical System for Laser-Based Speed Gun," now U.S. Pat. No. 10,146,103 issued Dec. 4, 2018, and which claims priority to U.S. Provisional Application Ser. No. 62/316,319 filed on Mar. 31, 2016. The full disclosures of each of the foregoing patents and patent applications are hereby incorporated by this reference in their entirety for all purposes as if fully set forth herein.

BACKGROUND OF THE INVENTION

The present invention relates, in general, to the field of handheld laser-based ranging and vehicle speed measurement devices and speed guns. More particularly, the present invention relates to a handheld laser-based ranging and vehicle speed measurement device incorporating on-board data storage with a Global Positioning System ("GPS"), compass, excessive panning detection, and voice recognition technology. The device also records minimum and maximum speeds of a plurality of vehicles along a roadway and performs the calculation of $85^{th}$ percentile speed.

The word "laser" stands for "Light Amplification by Stimulated Emission of Radiation." The type of laser device utilized in Laser Technology, Inc. ("LTI") products can be an infrared, semiconductor, gallium arsenide ("GaAs") laser diode. The generated light energy can have a wavelength of approximately 905 nanometers, with a beam divergence of 3.0 milliradians which can equate to a beam width of roughly 0.3 meters at 100 meters or approximately 3 feet at a distance of 1000 feet. This can be used by police officers to visually identify a speeding vehicle, pinpoint its exact location on the roadway, and then validate its precise speed.

In operation, such products calculate distance by measuring the time of flight of very short pulses of infrared light. This differs from the traditional surveying instrument method of measuring phase shifts by comparing the incoming wavelength with the phase of the outgoing light.

Any solid object (e.g. a vehicle) will reflect back a certain percentage of the emitted light energy. This only needs to be a small percentage for a sensitive photodiode detector to pick it up. The time it takes a laser pulse to travel to the target and back is then measured with a precision, crystal-controlled time base.

With knowledge of the constant speed of light, the distance traveled is first calculated and then the speed of the object can be calculated using the changing distances over time.

For increased accuracy, LTI speed and distance measuring devices can process as many as sixty pulses in a single measurement period with target acquisition times ranging from 0.3 to 0.7 seconds. Sophisticated accuracy validation algorithms can be utilized to ensure a reliable reading. Such laser-based devices are completely eye safe, meeting FDA Class 1 specifications. The radiated light power of the lasers utilized can be on the order of 50 microwatts, or approximately one twentieth the light power of a typical TV remote control.

Also related to vehicle speed measurement is the establishment of road and highway speed limits as set by various jurisdictions. The traffic engineering industry standard utilized in setting the regulatory speed limit for a roadway generally uses the "85th percentile speed." The 85th percentile speed is usually defined as, "the speed at or below which 85 percent of all vehicles are observed to travel under free-flowing conditions past a monitored point." Stated another way, this is the speed at which only 15% of traffic would violate this speed on average. Traffic engineers use the 85th percentile speed as a standard to set the speed limit at a safe speed which results in minimizing crashes and promoting uniform traffic flow along a corridor. See, for example, Technical Resources, "Setting Speed Limits" of the Institute of Transportation Engineers at www.ITE.org.

SUMMARY OF THE INVENTION

Disclosed herein is a laser-based speed gun with extremely fast target acquisition and an integrated ultra-bright 2× magnified heads-up display (HUD). A speed gun in accordance with the present invention may further include a built-in global positioning system (GPS), an intuitive button and display interface, and enhanced communication capability utilizing Bluetooth Dual Mode. The speed gun disclosed herein can utilize a strong and light weight magnesium chassis with an aluminum rubber armored outer housing providing 100% water ingress protection (IP67 waterproof construction). The speed gun disclosed herein can incorporate a collapsible shoulder rest integrated into the speed gun handle. The memory of the speed gun can provide a recall mode with 500 or more measurements and statistics together with a fixed distance, zero velocity confidence test.

In particular embodiments of the present invention, the laser-base speed gun can provide a maximum range in a Speed Mode of operation of at least 3,408 meters or 10,000 feet. In a Survey Mode of operation, the speed gun can provide a minimum range of 0 meters or 0 feet and in Speed Mode, 15.0 meters or 50 feet. In operation the speed gun can be capable of measuring vehicle or target object speed of 0-320 kilometers per hour or 0-200 miles per hour with a speed accuracy of −/+2 kph or −/+1 mph.

A speed gun in accordance with the present invention may incorporate an RS-232, 6 pin connector communications port and Bluetooth Low Energy (BLE) input/output (I/O) capability. The speed gun may further provide a 5.0 volt Universal Serial Bus (USB) external output with a 6 button user input. The speed gun may be powered by 4 AA alkaline or rechargeable batteries or an external power source such as a main voltage or automobile charger with a standard cigarette plug connector.

The speed gun of the present invention may comprise an extruded aluminum outer shell with an aluminum internal chassis with an approximately 4.0 pound weight. The display of the speed gun may incorporate the assignees' proprietary backlighting technique disclosed and claimed in U.S. Pat. No. 9,964,805, the disclosure of which is herein specifically incorporated by this reference. The display may also include a reticle which can represent the laser beam size at differing distances. The GPS function of the laser speed gun may be 22 tracking and 66 acquisition.

Particularly disclosed herein is a laser-based speed gun which comprises a processor and laser signal transmitting and receiving sections coupled to the processor for determining a speed of a target vehicle based on changes in distance between the target vehicle and the speed gun over time. The speed gun further comprises a rate gyro coupled to the processor to determine an angular velocity of the speed gun during operation and to indicate if the angular velocity exceeds a determined threshold velocity wherein an indicated speed of the target vehicle is possibly invalid.

On-board data storage can be provided in conjunction with the processor for recording data indicative of the target vehicle speed. The on-board storage can also record a plurality of vehicle speeds along a roadway to establish a spread of vehicle speeds from among the plurality of vehicle speeds. The speed gun can further comprise a GPS system coupled to the processor, with the GPS system operative to synchronize a clocking input to the processor in measuring the changes in distance between the target vehicle and the speed gun over time.

The speed gun can further comprise a magnetic sensor coupled to the processor. The magnetic sensor can provide an indication of a magnetic direction in which the speed gun is oriented when recording the target vehicle speed.

Also further disclosed herein is an electronic device having a user holdable handle, with the device comprising an articulating shoulder rest disposed within the handle. The handle of the device can comprise a cover for at least a portion of the shoulder rest, with the cover being displaceable from the handle to enable the shoulder rest to be pivotably deployed from the handle from a first stowed position to a second extended position.

The speed gun can further comprise on-board data storage for recording data indicative of the target vehicle speed and a microphone. A speech recognition system can be coupled to the microphone and the processor, with the speech recognition system operative to add oral notations in analog or text format from an operator of the speed gun in conjunction with the speed of the target vehicle in the on-board data storage. The speech recognition function disclosed herein can further be applicable to a laser-based ranging instrument not implemented to determining the speed of an object.

The speed gun can further comprise on-board data storage for recording data indicative of a given target vehicle speed as well as the recordation of general traffic speeds of multiple vehicles on a given roadway. This can include, for example, minimum vehicle speed, maximum vehicle speed, and statistics enabling the computation of $85^{th}$ percentile speed and the like.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 1A is a front elevational view of a representative speed gun in accordance with the present invention;

FIG. 1B is a left side elevational view of the representative speed gun of the preceding figure;

DESCRIPTION OF A REPRESENTATIVE EMBODIMENT

Figure 1C:
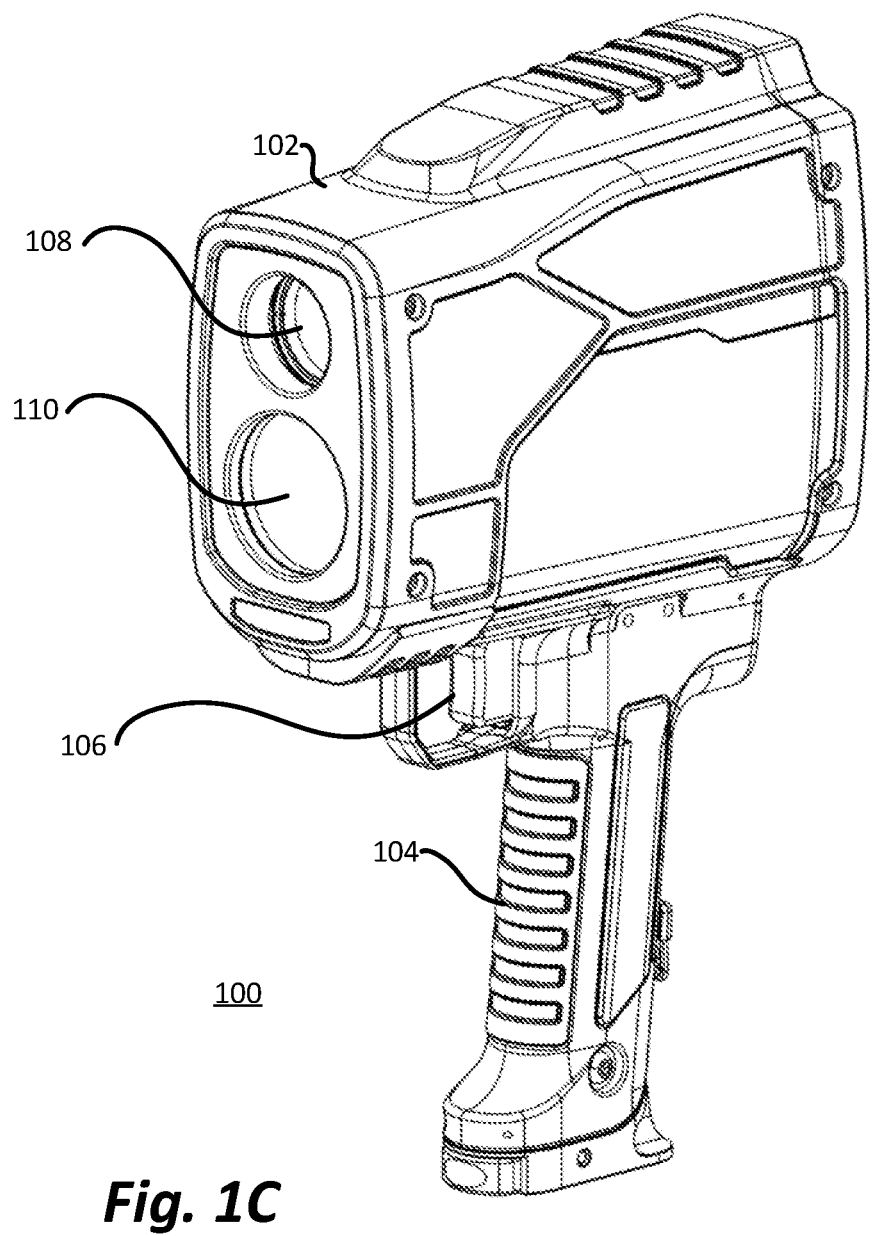
FIG. 1C is a left front isometric view of the representative speed gun of FIGS. 1A and 1B.

With reference now to FIG. 1A, a front elevational view of a representative laser-based speed gun 100 is shown in accordance with the principles of the present invention. The laser-based speed gun 100 comprises a housing 102 and associated handle 104 for handheld operation. A trigger 106 can be provided to initiate the transmission and reception of laser pulses toward a moving object, such as a target vehicle. The speed gun 100 can incorporate a laser pulse emission aperture 108 and a reflected laser pulse reception aperture 110. FIGS. 1B and 1C depict a left side elevation view and front isometric view of the speed gun 100 of FIG. 1A.

Figure 1D:
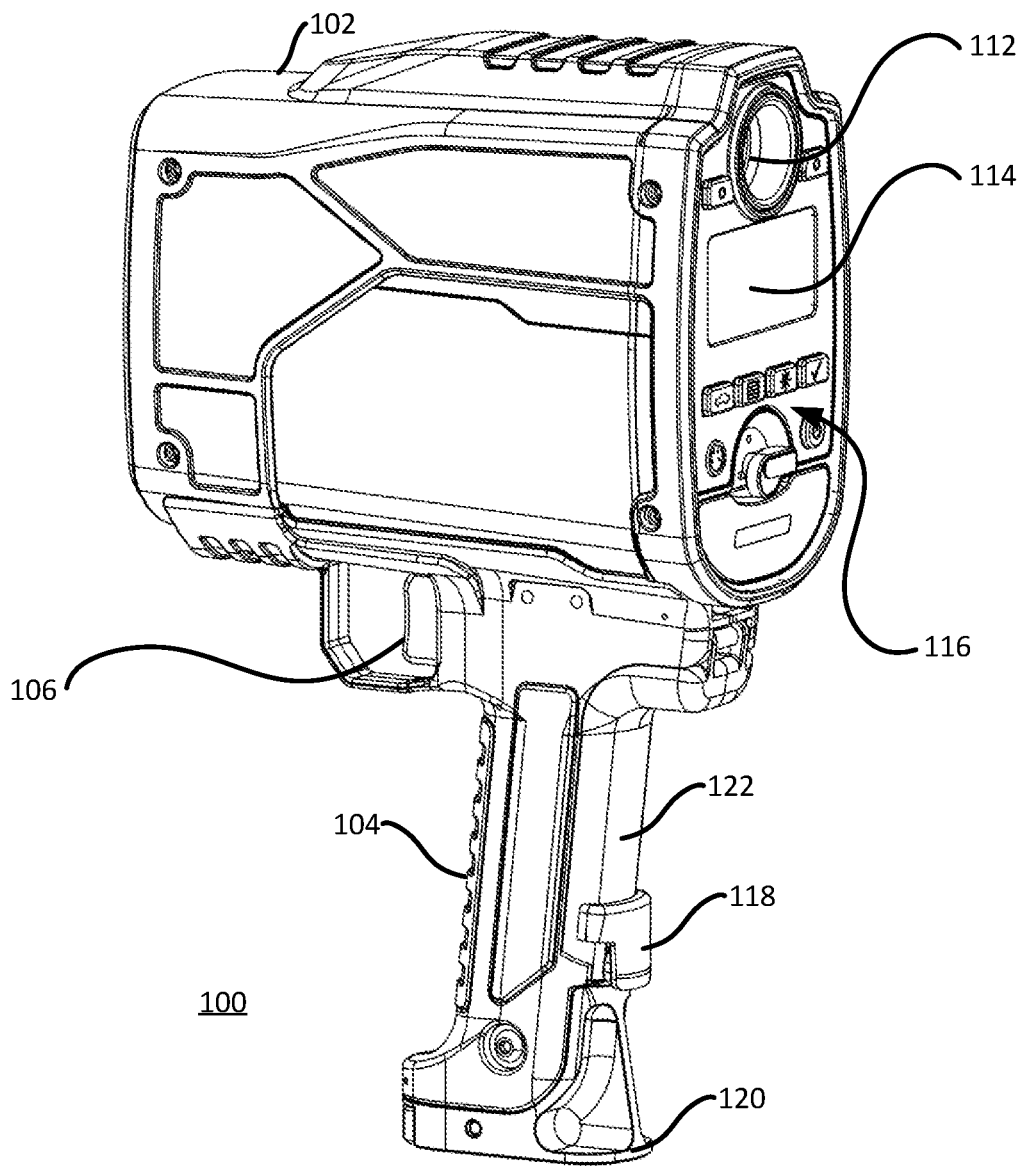
FIG. 1D is a left rear isometric view of the representative speed gun of FIGS. 1A through 1C and further illustrating components of an integral shoulder rest incorporated within the handle of the speed gun.

With reference now to FIG. 1D, a left rear isometric view of the speed gun 100 is shown further illustrating user viewable and actuatable components, and more detail as to the shoulder rest integrated within the speed gun 100 handle 104. The speed gun 100, as illustrated, can include a sighting port 112 which can allow a user to view a potential target vehicle through an optical pathway in conjunction with the laser pulse emission aperture 108. The speed gun 100 can further include a user viewable display 114 and user input and user actuatable activation and mode selection elements 116.

The representative speed gun 100 can further incorporate an integral shoulder rest recessed within the handle 104 which can be deployable by means of a release mechanism 118. The integral shoulder rest can include the distal end 120 of the handle 104 as protected by an articulated cover 122 when in the stowed position.

Figure 1E:
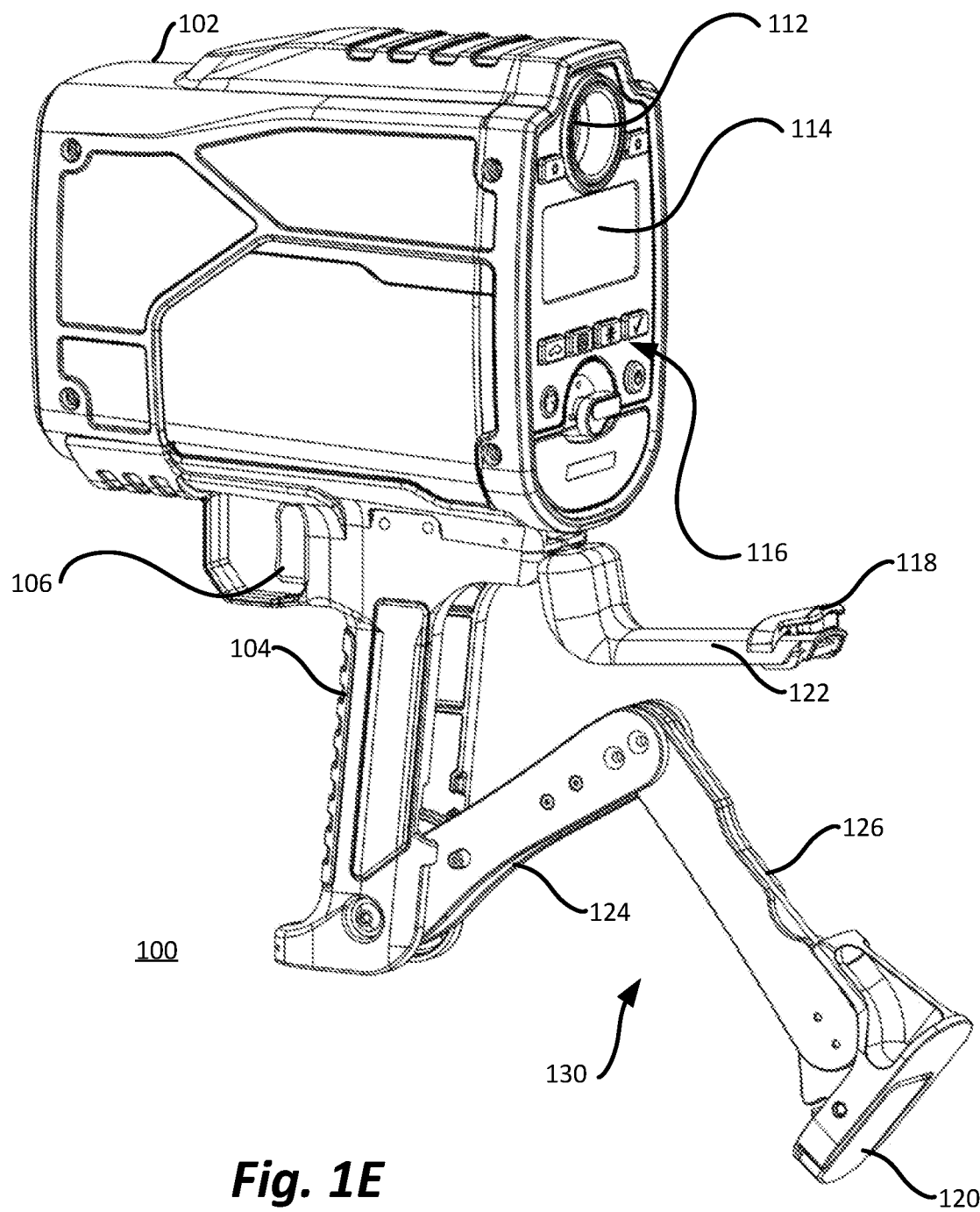
FIG. 1E is a further left rear isometric view of the representative speed gun of the preceding figures illustrating additional components of the integral shoulder rest cover and shoulder rest as they are in a position extending outward from the handle of the speed gun.

With reference now to FIG. 1E, a further left rear isometric view of the speed gun 100 is illustrated depicting additional components of the integral articulated shoulder rest cover 122 and shoulder rest as they are in a position extending outward from the handle 104 of the speed gun 100.

When the release mechanism 118 is activated, the articulated shoulder rest cover 122 may be moved in an upward direction to allow the distal end 120 to be moved from the base of the handle 104 extending a first arm 124 which pivots from the base of the handle 104 along with a concentrically mounted and pivoting second arm 126 to which the distal end 120 is secured. The first and second arms 124 and 126 along with the distal end 120 comprise a shoulder rest 130 which can be deployable and stowable by users of the speed gun 100.

Figure 1F:
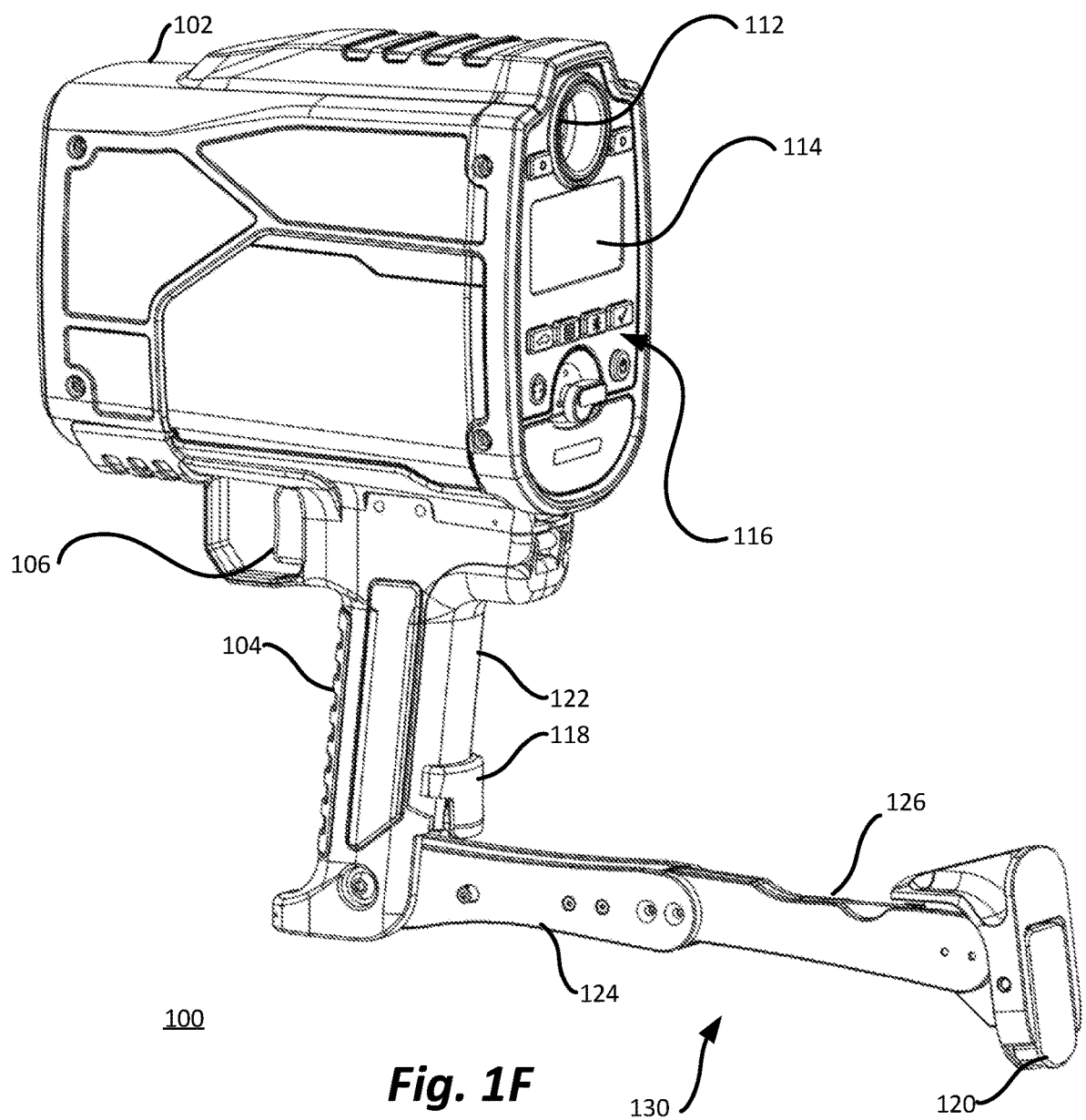
FIG. 1F is an additional left rear isometric view of the representative speed gun of the preceding figures illustrating the integral shoulder rest as it is extended fully outward of the handle of the speed gun with the shoulder rest cover once again aligned with the handle.

With reference now to FIG. 1F, an additional left rear isometric view of the representative speed gun 100 is illustrated depicting the integral shoulder rest 130 as it is extended fully outward of the handle 104 of the speed gun 100 with the articulated shoulder rest cover 122 once again aligned with the handle 104.

Additional features of the representative laser-based speed gun 100 may also be implemented in accordance with the disclosure of commonly owned U.S. Pat. No. 10,146,103 issued Dec. 4, 2018 for "Camera Module and Folded Optical System for Laser-Based Speed Gun", the disclosure of which is specifically incorporated by this reference in its entirety as if fully set forth herein.

Figure 2A:
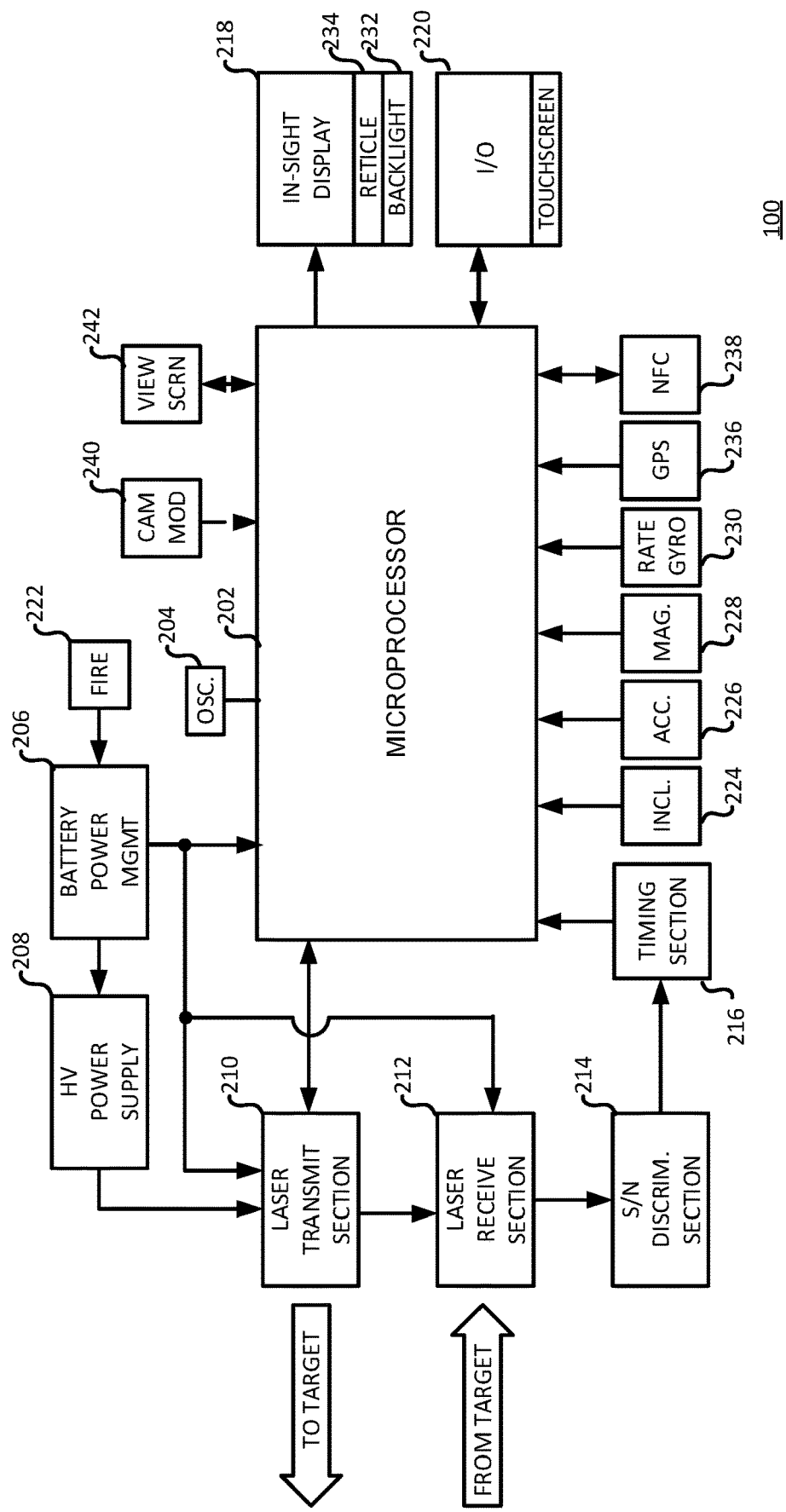
FIGS. 2A and 2B are representative functional block diagrams of the laser-based speed gun of the preceding figures in accordance with the principles of the present invention.

With reference now to FIG. 2A, a representative functional block diagram of the laser-based speed gun 100 in accordance with the principles of the present invention is shown.

The exemplary speed gun 100 comprises a microprocessor 202 or central processing unit (CPU) and can further include an associated oscillator 204 for providing clocking signals to the microprocessor 202. A battery and power management section 206 can supply operating power to the microprocessor 202 and various other speed gun 100 subsystems. The high voltage (HV) power supply 208 can provide operating voltage to a laser transmit section 210 and associated laser diode as well as a laser receive section 212 and associated photodiode.

The laser receive section 212 can receive a portion of the laser energy transmitted by the laser transmit section 210 as reflected by a target vehicle to a photodiode and can provide the return signals to a signal/noise (S/N) discriminator section 214 in order to separate true return pulses from any associated noise. A timing section 216 can accurately measure the time between the transmission of laser pulses from the laser transmit section 210 and the reception of the same reflected pulses at the laser receive section 212. This can determine, in conjunction with the microprocessor 202, the varying distance and resultant speed of the particular target vehicle towards which the speed gun 100 is aimed.

A fire button 222 as actuated by the trigger 106 can be coupled to the battery and power management section 206 and can be operable by a user of the speed gun 100 in conjunction with the microprocessor 202 to determine when to emit pulses toward a target vehicle from the laser transmit section 210.

The speed gun 100 may also incorporate a user viewable in-sight display 218 implemented in conjunction with a backlighting technique. In this regard, the in-sight display 218 may be configured to provide the user with a view of the target vehicle in conjunction with an aiming reticle as well as information regarding the range to the target vehicle, the speed of the target vehicle, battery conditions, and other information. In certain embodiments, the speed gun 100 may also comprise a touchscreen display to allow the user to provide inputs to the speed gun 100 in conjunction with, or as an alternative to, an input/output (I/O) section 220.

The I/O section 220 may further comprise a keypad (e.g. selection elements 116 of FIG. 1B) or other means of communicating information to or from the microprocessor 202. This can include wired connections such as a universal serial bus (USB) and the like as well as wireless connections such as an IEEE 802.11 (Wi-Fi), or other wireless local area network (WLAN) transceiver; a Bluetooth transceiver or other personal area network (PAN) system for wirelessly exchanging data over short distances; and/or another near field communication (NFC) transceiver (inclusive of infrared (IR) coupling) for wirelessly coupling the speed gun 100 to external devices or data storage elements.

As illustrated, the speed gun 100 may further include one or more additional input modules such as an inclinometer 224, accelerometer 226, magnetic sensor 228 (e.g. a compass), and/or rate gyro 230.

As an exemplary utilization of a backlighting technique for LCDs and other display devices in electronic speed guns of the present invention, the speed gun 100 is illustrated as incorporating a backlight 232. In a representative embodiment of the speed gun 100, the backlight 232 may be provided in accordance with the specification and teachings of commonly owned U.S. Pat. No. 9,964,805 issued on May 8, 2018 for: "Backlighting Technique for Liquid Crystal and Other Displays in Electronic Speed Guns," the disclosure of which is specifically incorporated by this reference in its entirety as if fully set forth herein. As further illustrated, the speed gun 100 may comprise a reticle 234 interposed between the backlight 232 and the in-sight display 218 as is more fully described in the aforementioned '805 patent.

A global positioning satellite (GPS) module 236 may also form a portion of the speed gun 100 to provide information to the microprocessor 202 as to the specific geographic position of the speed gun 100. In addition, the speed gun 100 may further include an NFC module 238 capable of enabling external bidirectional communication with the speed gun 100 via Bluetooth, Wi-Fi, and the like in conjunction with a smartphone, tablet device, computer laptop, or any other appropriate external device.

In an alternative embodiment of the present invention, the speed gun 100 may further be configured to provide an augmented reality display to a user by the optional camera module 240 and view screen 242. In this manner, by angularly scanning the speed gun 100 about a target vehicle, other features and objects in the surrounding scene can be displayed in the view screen 242, on an in-sight display 218, and/or on the screen of an associated smartphone, tablet device, or laptop to a user of the speed gun 100. The determined distances to such additional features and objects can also be displayed to provide additional terrain context over and above the speed of, or distance to, the desired target vehicle. Such features and objects might be trees, highway overpasses, signs, buildings, and the like. The camera module 240 can then be operational to log the surrounding features and objects, and their distances determined by the laser-based speed gun 100.

Figure 2B:
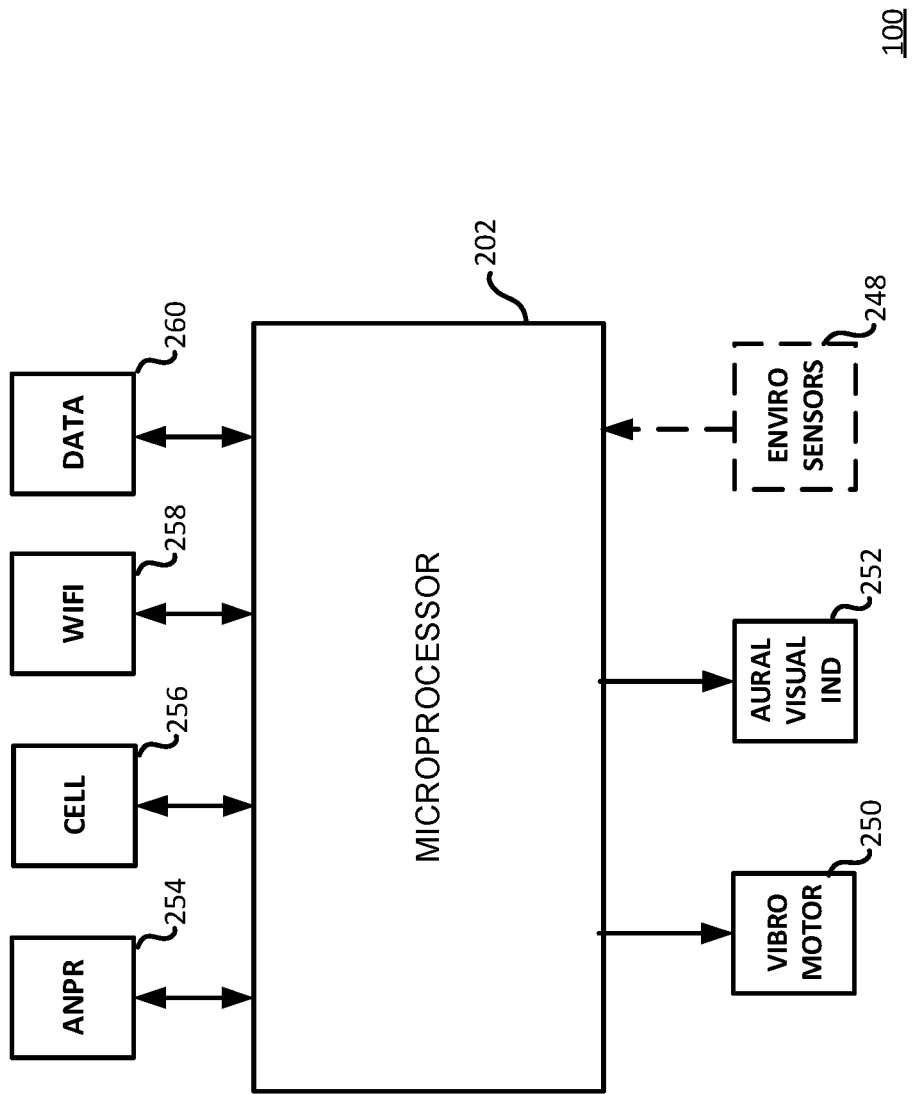

With reference now to FIG. 2B, an additional representative portion of the functional block diagram of the laser-based speed gun 100 of the preceding figure is shown illustrative of an embodiment of the present invention which may further include a vibro-motor 250 and one or more audio and/or visual indicators 252. The vibro-motor 250 and one or more audio and/or visual indicators 252 can be used to provide physical, haptic, audible, and/or visible feedback to the user of the laser-based speed gun 100. A laser-based speed gun 100 in accordance with the present invention may also include an ANPR function block 254, a cellular telephony block 256, a Wi-Fi block 258, and/or a NFC or other communications medium to bidirectionally communicate data regarding a target vehicle's speed, license plate number, and/or other information to and from a location and database remote from the laser-based speed gun 100. The ANPR function block 254 may be operative in conjunction with the microprocessor 202 and the camera module 240 as disclosed in co-pending and commonly owned U.S. patent application Ser. No. 16/688,633.

Further illustrated are various sensors comprising environmental sensors 248 which provide inputs to a laser-based speed gun 100. Such sensors may include those for sensing temperature, wind velocity, atmospheric pressure, humidity, rain, snow, other precipitation, and the like as such information may be useful in conjunction with a speed gun 100 in establishing the surrounding environmental conditions at a given time or when the speed of a target vehicle is recorded.

A system comprising the laser-based speed gun 100 may further include on-board volatile, non-volatile, read/write, and/or read only memory as database 260 of sufficient capacity for all functions resident in the laser-based speed gun 100 itself. In other embodiments of the present invention the database or portions thereof may be located remotely in communication with the laser-based speed gun 100. The database 260 may, for example in an ANPR application, comprise number plates of particular interest to authorities which can then be matched to the number plate of a target vehicle as determined by the ANPR functionality. This information can be added to the database 260 or communicated to the operator of the laser-based speed gun 100 by haptic, aural, and/or visual means by the vibro-motor 250 and the aural visual indicator 252.

Figure 2C:
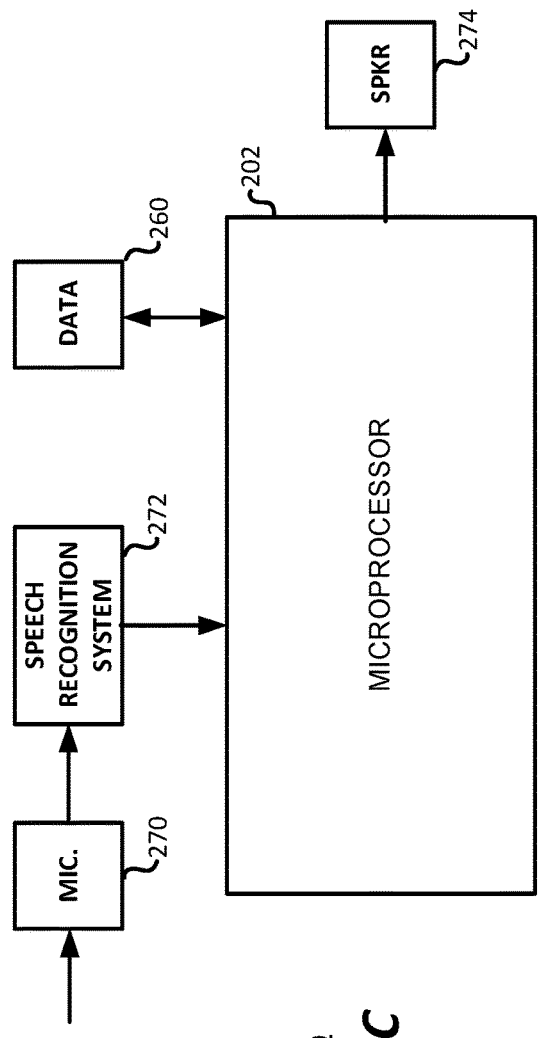
FIGS. 2C and 2D are additional representative functional block diagrams of the speech recognition and voice command features of the laser-based speed gun of the preceding figures.
Figure 2D:
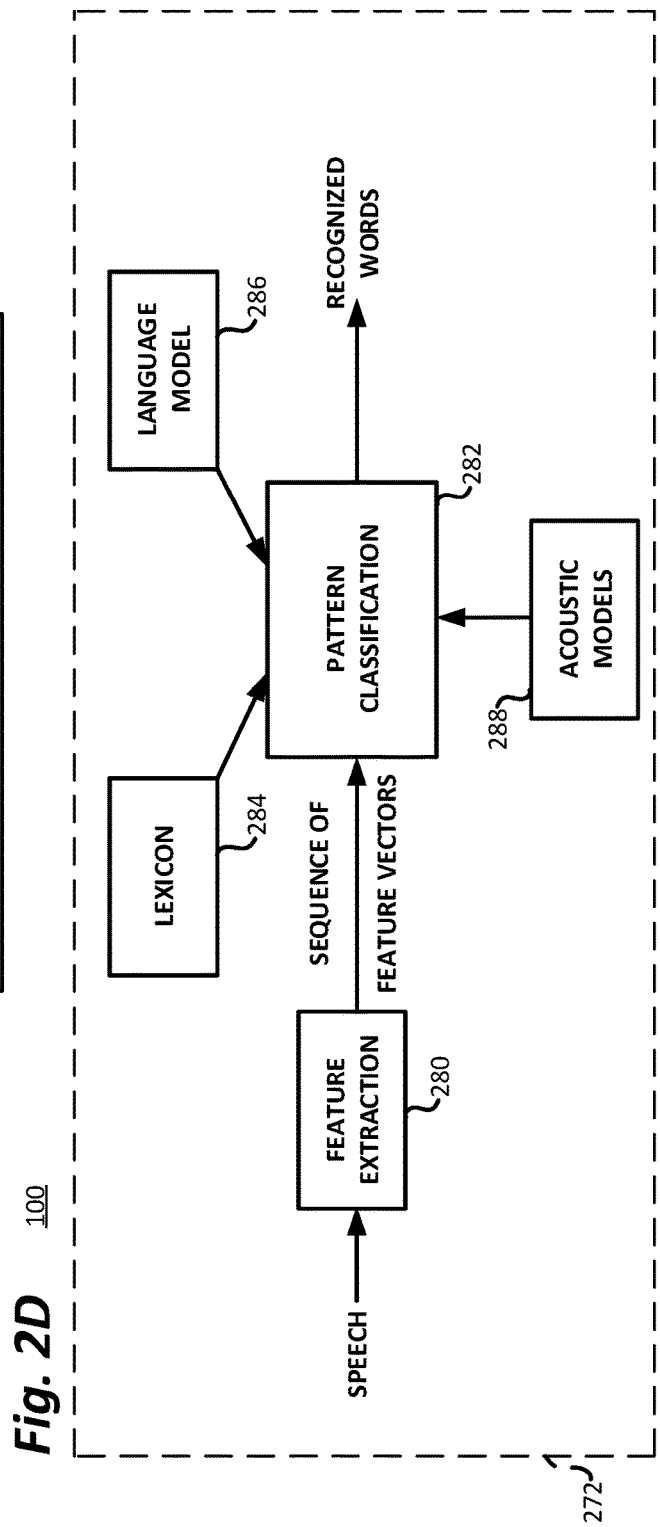

With reference now to FIGS. 2C and 2D, functional block diagrams of a possible implementation of a speech recognition system as may be employed in a laser-based ranging instrument or in the form of a speed gun 100 are shown.

As illustrated with reference to FIG. 2C an exemplary speed gun 100 may include a microphone 270 for recording an officer's voice notations in database 260 or responding to voice commands such as navigating the speed gun 100 program menus. The microphone is illustrated as providing input to a speech recognition 272 which can be coupled to the microprocessor 202 for communication with the database 260. The microprocessor may also provide speech output to a speaker 274, headphones, or other aural transducer.

With reference now to FIG. 2D, a more detailed functional block diagram of a speech recognition system 272 is illustrated for use in an exemplary implementation of a speed gun 100. As shown, output from the microphone 270 can provide a speech input to a feature extraction block 280 which, in turn, can provide a sequence of feature vectors to a pattern classification unit 282. The pattern classification unit 282 can also receive inputs from a lexicon block 284, a language model block 286, and an acoustic models block 288. Output of the pattern classification unit 282 is then in the form of recognized words as illustrated.

In a representative embodiment of a laser speed gun 100 in accordance with the present invention, the speed gun 100 may include a microprocessor 202, a GPS module 236, a compass such as magnetic sensor 228, and on-board data storage in the form of database 260. In addition, a rate gyro 230 may also be employed to provide a speed gun panning indication to the microprocessor 202. The output of the rate gyro 230 can be utilized to determine if the operator of the speed gun 100 is panning a target vehicle with an angular velocity that is too fast with respect to a determined panning speed to accurately provide an indication of a vehicle's speed. This can be the case when the officer is on the side of a roadway on which such vehicles may be travelling. In this manner, possible erroneous speed indications can thereby be precluded before being stored in the database 260. An audible, visual, or haptic indication of excessive panning speed may also be provided to the officer utilizing the speed gun 100 by means of the aural and/or visual indicator 252 or vibro-motor 250.

In operation the magnetic sensor 228 can provide input to the microprocessor 202 to provide information that might be stored in the database 260 as to the direction or compass heading toward which the speed gun 100 is pointed such as with respect to approaching or receding traffic on a roadway. As an example, the speed gun 100 can then record in the database 260 the speed, distance, and heading of a target vehicle in addition to an identification of the particular speed gun 100 employed in recording this information.

The GPS module 236 may also be utilized to record the physical position of the speed gun 100 in the database 260 when speed measurements of target vehicles are recorded. Further, the GPS module 236 may also be utilized to provide real time synchronization to the on-board clock by the satellite thereby providing the speed gun 100 with an absolute self-correcting clock signal. In this manner each speed measurement recorded in the database 260 can be provided with an accurate date/time clock stamp which cannot be changed once entered.

As previously mentioned, the microphone 270 may be utilized by an officer to make oral notes (in analog or text format) in the database 260 with respect to each entry regarding a recorded speed. The microphone 270, in conjunction with the speech recognition system 272, may be utilized to provide verbal or written notations with respect to each entry regarding a recorded vehicle speed in the database in addition to enabling an officer to navigate the speed gun's program menus orally instead of stepwise through manual inputs.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A handheld laser-based speed gun comprising:
a shared processor;
laser signal transmitting and receiving sections coupled to the shared processor for determining a measured speed of a target vehicle based on changes in distance between the target vehicle and the speed gun over time; and
a rate gyro coupled to the shared processor, the rate gyro with the shared processor operative to determine an angular velocity of the speed gun during a tracking operation to determine a measured speed of said target vehicle and indicating if the angular velocity of the speed gun exceeds a determined threshold angular velocity wherein the measured speed of the target vehicle is deemed to be invalid.

2. The speed gun of claim 1 further comprising:
on-board data storage for recording data indicative of the measured speed.

3. The speed gun of claim 2 wherein the measured speed of the target vehicle is not recorded in the on-board data storage when the angular velocity of the speed gun exceeds the determined threshold velocity.

4. The speed gun of claim 1 wherein a user of the speed gun receives an indication of the angular velocity exceeding the determined threshold velocity by means of at least one of an aural, visual, or haptic indicator.

5. The speed gun of claim 1 further comprising:
a GPS system coupled to the shared processor; the GPS system operative to synchronize a clocking input to the shared processor in measuring the changes in distance between the target vehicle and the speed gun over time.

6. The speed gun of claim 5 wherein the synchronized clocking input to the shared processor provides a time stamp to an on-board data storage recording the measured speed.

7. The speed gun of claim 6 wherein the time stamp associated with the target vehicle speed is unalterable in the on-board data storage.

8. The speed gun of claim 1 further comprising:
a magnetic sensor coupled to the shared processor, the magnetic sensor providing an indication of a magnetic direction in which the speed gun is oriented while recording the measured speed.

9. The speed gun of claim 8 wherein the magnetic direction is stored in an on-board data storage in conjunction with the measured speed.

10. The speed gun of claim 1 further comprising a microphone enabling a user of the speed gun to add verbal notes to an on-board data storage in conjunction with the measured speed.

11. A handheld laser-based speed gun comprising:
a shared processor;
laser signal transmitting and receiving sections coupled to the shared processor for determining a measured speed of a target vehicle based on changes in distance between the target vehicle and the speed gun over time;
on-board data storage in conjunction with the shared processor for recording data indicative of the measured speed of a plurality of target vehicles along a roadway and operative to record said plurality of vehicle speeds to establish a spread of vehicle speeds from among the plurality of measured target vehicle speeds; and
a rate gyro coupled to the shared processor, the rate gyro with the shared processor operative to determine an angular velocity of the speed gun during operation and indicating if the angular velocity exceeds a determined threshold velocity wherein the measured speed of the target vehicle is deemed to be invalid.

12. The laser-based speed gun of claim 11 wherein the on-board data storage is further operative to establish at least one of a maximum or minimum vehicle speed from among the plurality of vehicle speeds.

13. The laser-based speed gun of claim 11 wherein the on-board data storage is further operative to establish an 85th percentile vehicle speed from among the plurality of vehicle speeds.

14. The laser-based speed gun of claim 11 further comprising:
a GPS system coupled to the shared processor, the GPS system operative to synchronize a clocking input to the shared processor in measuring the changes in distance between the target vehicle and the speed gun over time.

15. The speed gun of claim 14 wherein the synchronized clocking input to the shared processor provides a time stamp to the on-board data storage recording the measured speed.

16. The speed gun of claim 15 wherein the time stamp associated with the measured speed is unalterable in the on-board data storage.

17. The speed gun of claim 11 wherein data of the measured speed is not recorded in the data storage when the angular velocity of the speed gun exceeds the determined threshold velocity.

18. The speed gun of claim 11 wherein a user of the speed gun receives an indication of the angular velocity exceeding the determined threshold velocity by means of at least one of an aural, visual, or haptic indicator.

19. The speed gun of claim 11 further comprising:
a magnetic sensor coupled to the shared processor, the magnetic sensor providing an indication of a magnetic direction in which the speed gun is oriented in recording the measured speed.

20. The speed gun of claim 19 wherein the magnetic direction is stored in the on-board data storage in conjunction with the measured speed.

21. A handheld laser-based speed gun comprising:
a shared processor;
laser signal transmitting and receiving sections coupled to the shared processor for determining a measured speed of a target vehicle based on changes in distance between the target vehicle and the speed gun over time;
a magnetic sensor coupled to the shared processor, the magnetic sensor providing an indication of a magnetic direction in which the speed gun is oriented in recording the measured speed; and
a rate gyro coupled to the shared processor, the rate gyro operative to determine an angular velocity of the speed gun during operation and indicating if the angular velocity exceeds a determined threshold velocity wherein the measured speed of the target vehicle is deemed to be invalid.

22. The speed gun of claim 21 wherein the magnetic direction is stored in on-board data storage in conjunction with the measured speed.

23. The speed gun of claim 21 further comprising:
a GPS system coupled to the shared processor, the GPS system operative to synchronize a clocking input to the shared processor in measuring the changes in distance between the target vehicle and the speed gun over time.

24. The speed gun of claim 23 wherein the synchronized clocking input to the processor provides a time stamp to on-board data storage recording the measured speed.

25. The speed gun of claim 24 wherein the time stamp associated with the target vehicle speed is unalterable in the on-board data storage.

26. The speed gun of claim 21 further comprising:
on-board data storage for recording data indicative of the measured speed.

27. The speed gun of claim 26 wherein data of the measured speed is not recorded in the data storage when the angular velocity of the speed gun exceeds the determined threshold velocity.

28. The speed gun of claim 21 wherein a user of the speed gun receives an indication of the angular velocity exceeding the determined threshold velocity by means of at least one of an aural, visual, or haptic indicator.

29. The speed gun of claim 21 further comprising:
a microphone enabling a user of the speed gun to add verbal notes to on-board data storage in conjunction with the measured speed.

* * * * *